(12) United States Patent  
Rozzi

(10) Patent No.: US 7,177,047 B2  
(45) Date of Patent: Feb. 13, 2007

(54) GAMUT-PRESERVING COLOR IMAGING

(75) Inventor: William A. Rozzi, West Lakeland Township, MN (US)

(73) Assignee: Eastman Kodak Company, Rochester, NY (US)

( * ) Notice: Subject to any disclaimer, the term of this patent is extended or adjusted under 35 U.S.C. 154(b) by 1152 days.

(21) Appl. No.: 09/741,460

(22) Filed: Dec. 19, 2000

(65) Prior Publication Data

US 2002/0105659 A1    Aug. 8, 2002

(51) Int. Cl.  
*G06F 15/00*    (2006.01)

(52) U.S. Cl. .................. 358/1.9; 358/1.9; 358/2.1; 358/3.04; 358/517; 358/522; 358/530

(58) Field of Classification Search .............. 358/1.9, 358/1.16, 520, 2.1, 3.04, 517, 522, 530; 382/162  
See application file for complete search history.

(56) References Cited

U.S. PATENT DOCUMENTS

| | | | | |
|---|---|---|---|---|
| 5,237,425 A * | 8/1993 | Tagami et al. ............. 358/300 |
| 5,268,754 A * | 12/1993 | Van de Capelle et al. .. 358/527 |
| 5,481,380 A * | 1/1996 | Bestmann .................. 358/504 |
| 5,596,428 A * | 1/1997 | Tytgat et al. ............... 358/518 |
| 5,692,071 A * | 11/1997 | Govaert ..................... 382/167 |
| 5,798,943 A | 8/1998 | Cook |
| 5,832,109 A * | 11/1998 | Mahy ........................ 382/162 |
| 5,999,703 A | 12/1999 | Schartz |
| 6,072,901 A | 6/2000 | Balonon-Rosen |
| 6,204,939 B1 * | 3/2001 | Lin et al. ................... 358/518 |
| 6,268,939 B1 * | 7/2001 | Klassen et al. ............. 358/518 |
| 6,331,899 B1 * | 12/2001 | Samadani ................... 358/1.9 |
| 6,362,808 B1 * | 3/2002 | Edge et al. ................. 345/601 |
| 6,646,763 B1 * | 11/2003 | Estrada ...................... 358/1.9 |
| 6,650,771 B1 * | 11/2003 | Walker ....................... 382/162 |
| 6,707,938 B2 * | 3/2004 | de Queiroz et al. ........ 382/162 |
| 6,714,319 B1 * | 3/2004 | Thieret et al. .............. 358/1.9 |
| 6,757,076 B1 * | 6/2004 | Mestha et al. .............. 358/1.9 |
| 6,822,757 B1 * | 11/2004 | Usami et al. ............... 358/1.9 |
| 2003/0147088 A1 * | 8/2003 | Kulkarni .................... 358/1.9 |

OTHER PUBLICATIONS

Victor Ostromoukhov, "Chromaticity gamut enhancement by hepatone multi-color printing," Proceedings SPIE vol. 1909/Device Independent Color Imaging and Imaging Systems Integration, Feb. 1993, p. 139-151.

(Continued)

*Primary Examiner*—David Moore  
*Assistant Examiner*—Michael Burleson  
(74) *Attorney, Agent, or Firm*—Shumaker & Sieffert; Mark G. Bocchetti

(57) ABSTRACT

A color imaging technique includes setting a target value in a device-independent first color space and mapping the target value to a substantially complete point set in a second color space. The point set may include a plurality of points, each of which define substantially the same colorimetric value via a unique combination of colorants. After mapping the target value to a substantially complete point set, a point may be chosen. Moreover, after choosing a point in the point set, device-dependent colorant values defined by the point may be determined. In this manner, the invention may provide control over the colorants that are used to image a particular color.

37 Claims, 10 Drawing Sheets

OTHER PUBLICATIONS

Gabriel Marcu and Satoshi Abe, "Color Designing and Simulation in Non-Conventional Printing Process," Proceedings SPIE vol. 2298/Applications of Digital Image Processing XVII, Jul. 1994, p. 216-223.

Yongyi Yang and Henry Start, "Solutions of several color-matching problems using projection theory," Journal Optical Society of America, vol. 11, No. 1, Jan. 1994, p. 89-96.

Sigfredo Nin, James Kasson, and Wil Ploufee, "Printing CIELAB images on a CMYK printer using tri-linear interpolation," Proceedings SPIE vol. 1670/Color Hardcopy and Graphic Arts 1992, p. 316-324.

Eric Stollnitz, Victor Ostromoukhov, and David Salesin, "Reproducing Color Images Using Custom Inks," ACM SIGGRAPH 1998 Conference Proceedings, p. 266-274.

Po-Chieh Hung, "Colorimetric calibration in electronic imaging devices using a look-up-table model and interpolations", Journal of Electronic Imaging, Jan. 1993, vol. 2(1), p. 53-61.

Po-Chieh Hung, "Smooth colorimetric calibration technique utilizing the entire color gamut of CMYK printers", Journal of Electronic Imaging, Oct. 1994, vol. 3(4), p. 415-424.

Roy Berns, "Spectral modeling of a dye diffusion thermal transfer printer", Journal of Electronic Imaging, Oct. 1993, vol. 2(4), p. 359-370.

* cited by examiner

GAMUT-PRESERVING COLOR IMAGING

FIELD

The present invention relates to color imaging.

BACKGROUND

Color imaging devices use combinations of different colorants to form color images for display or printout on media such as paper or film. Many hardcopy printing devices use combinations of cyan, magenta, yellow, and black (CMYK) to form color imagery. These colorants (or device-dependent coordinates) of C, M, Y and K may correspond to a gamut of colorimetric values that the device is capable of producing. Other devices, such as monitors, may use the colorants red, green, and blue (RGB). Some high-fidelity color imaging devices may use the colorants cyan, magenta, yellow, and black in combination with other colorants such as orange and green. Although there is sometimes a non-linear relationship between device-dependent coordinates and colorants, the terms are used interchangeably in this document.

Device-independent coordinates have been developed to standardize color specification across different devices. For instance, one industry standard that is used to define different color values is the Commission Internationale de l'Eclairage L*a*b* color space (hereafter L*a*b* color space, L*a*b* space, or simply L*a*b*). A point in L*a*b* space defines a color value irrespective of any particular device coordinate. A point in L*a*b* space can be mapped to a point in a device gamut. That point in the device gamut, in turn, may define a combination of device colorants that will produce a color equivalent to that defined by the point in L*a*b* space.

Methods have been developed for converting and mapping device-dependent colorants such as RGB or CMYK into device-independent coordinates such as L*a*b*. FIG. 1 shows a representation of an example device-dependent gamut (e.g., on the left is an example RGB device coordinate gamut) and an example of a device-independent gamut (e.g., on the right is the corresponding L*a*b* coordinate gamut).

In the conversion process, however, if the number of colorants is greater than three, more than one point in a device gamut may be mapped to a single point in L*a*b* space. This presents a problem when converting from L*a*b* to the device-dependent colorants.

SUMMARY

In an exemplary embodiment, a process in accordance with the present invention sets a target value in a device-independent or colorimetric first color space and maps that target value to a substantially complete point set in a second color space. The target value may be a point in L*a*b* space, and the point set may include a plurality of points, each of which define substantially the same colorimetric value via a unique combination of colorants. The colorimetric value corresponding to each point in the point set may be substantially the same as that corresponding to the target value. The point set is substantially complete because it may contain substantially all of the points in the second color space that map to the target value of the first color space.

The second color space may be a device-dependent color space. Thus, by mapping the target value to a point set in a second color space, the invention may facilitate color generation in a device-dependent color space. Moreover, because a point set may include a plurality of points, each of which define substantially the same color via a unique combination of colorants, the invention may provide user control over the particular colorants that may be used to image a particular color.

The first color space may be an N-dimensional color space while the second color space may be an M-dimensional color space. Moreover, M may be greater than N. By way of example, the first color space may be a three-dimensional color space, while the second color space is a four-dimensional color space. The point set may be a space curve through the four-dimensional second color space. This space curve through a four-dimensional space may be represented by a collection of three parametric curves.

The first color space may be L*a*b* space, while the second color space may be defined by the four colors: black, magenta, cyan, and yellow. Alternatively, the second color space may be defined by at least four colors of the following group of colors: black magenta, cyan, yellow, orange, and green.

After a target value has been set in the first color space and mapped to a substantially complete point set in a second color space, a point may be chosen from the point set. Moreover, after choosing the point, a set of device-dependent colorant values defined by that point may be determined. These colorant values may collectively define a color, and in addition, every other color defined by a point in the point set may define substantially the same colorimetric value as that defined by the chosen point. After choosing the point, a color may be printed, the printed color being defined by the set of device-dependent colorant values associated with the chosen point. Choosing a point from the point set may comprise choosing a point on a space curve, or alternatively, choosing a point from the point set may comprise choosing a parameter value and the corresponding points in each of the collection of parametric curves that represent the space curve. Additionally, choosing a point from the point set may comprise choosing a colorant factor that defines a point in the point set.

Choosing a point from the point set may be performed by an end user, or alternatively, may be automatically performed by a machine. For instance, in one embodiment, an end user may choose a point from the point set according to a desired amount of a particular colorant. In another embodiment, a machine monitors at least one variable that defines at least one machine operational condition. The machine may choose the point based, at least in part, on the status of that variable. For instance, the machine may include a printer, and the machine may monitor the level of one or more colorants currently in the printer. If, for instance, a particular colorant is running low, the machine may choose the point so as to minimize use of the colorant that is running low. In this manner the invention may promote efficient use of system resources.

In other embodiments, one or more parameters may be introduced to simplify the step of choosing a point from the point set. One such parameter is a colorant factor, determined from multiple parameters and characteristics of the point set. A colorant factor is a number between zero and one, and may define a point within the point set as a function of the amount of one colorant. Either a machine or a user may choose the parameter. If a user chooses the parameter, a machine may compute the corresponding colorant values associated with that parameter.

In a further embodiment, if the spectrum of the target value and a spectral characterization of the device are available, the point from the point set may be selected to minimize metamerism, spectral distance, weighted spectral distance, or some other spectrally-based comparison between the target value spectrum and the spectrum produced by the device for the selected point's colorant amounts.

In another embodiment, a system includes a memory that stores a target value, the target value being a value in a device-independent first color space. The system may also include a processor that maps the target value to a substantially complete point set in a second color space.

In yet another embodiment, a computer readable medium contains program code that when executed by a computer: sets a target value in a device-independent first color space and maps the target value to a substantially complete point set in a second color space.

DETAILED DESCRIPTION

Figure 2:
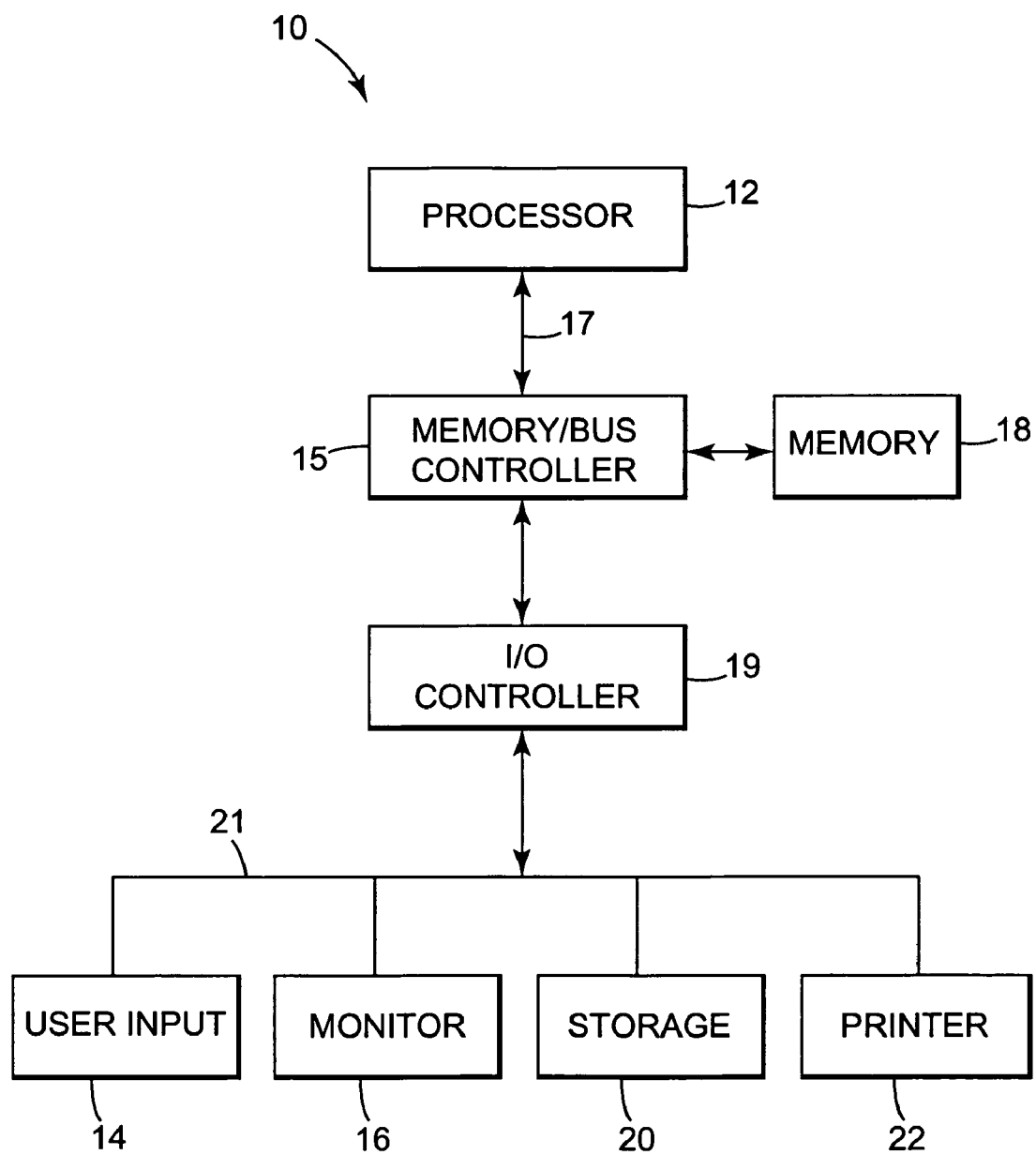
FIG. 2 is a block diagram of a system suitable for implementing a color imaging technique.

FIG. 2 is a block diagram illustrating a system 10 suitable for implementation of a color imaging technique in accordance with an embodiment of the invention. As shown in FIG. 2, system 10 may include processor 12, user input device 14, display monitor 16, memory 18, storage device 20, and printer 22. System 10 may substantially conform to conventional systems used by graphic artists and other users in the creation of graphic imagery for electronic display or print production. A memory/bus controller 15 and system bus 17 couple processor 12 and memory 18, while one or more I/O controllers 19 and I/O bus 21 couple the processor and memory to user input device 14, display monitor 16, storage device 20, and printer 22.

Processor 12 may take the form of a general purpose microprocessor and can be integrated with or form part of a PC, Macintosh, computer workstation, hand-held data terminal, palm computer, cell phone, digital paper, or the like. User input device 14 may include a conventional keyboard and pointing device such as a mouse, pen, or trackball, if desired. Monitor 16 may include a CRT, LCD, flat panel display, or the like, that displays textual and/or graphic information to the user. Memory 18 may include random access memory (RAM) storing program code that is accessed and executed by processor 12 to carry out methods of color imaging.

The program code can be loaded into memory 18 from storage device 20, which may take the form of a fixed hard drive or removable media drive associated with system 10. For example, the program code can be initially carried on computer-readable media such as magnetic, optical, magneto-optic or other disk or tape media. Alternatively, the program code may be loaded into memory 18 from electronic computer-readable media such as EEPROM, or downloaded over a network connection. The program code may be embodied as a feature in an application program providing a wide range of imaging functionality.

Figure 3:
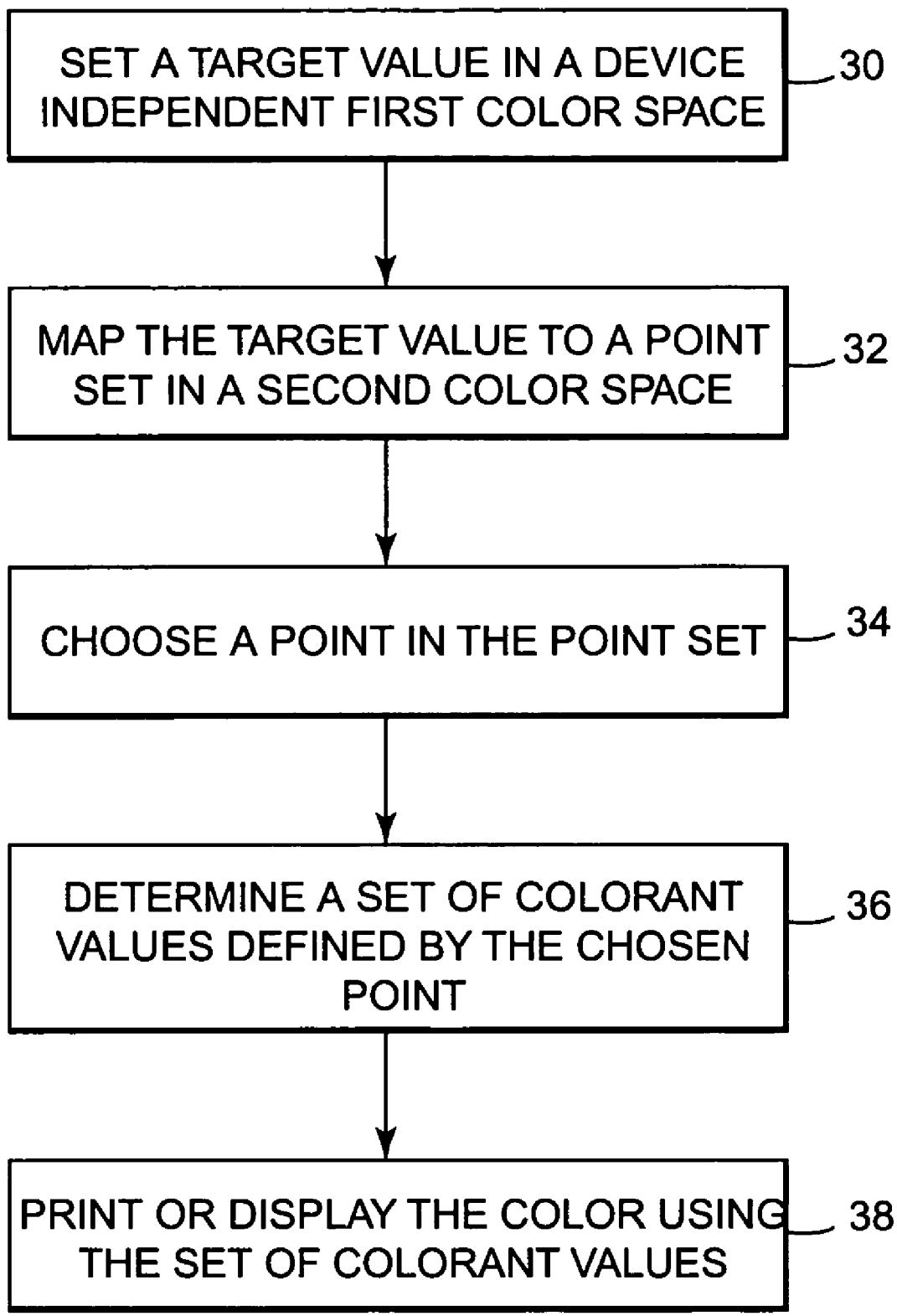
FIG. 3 is a flow diagram illustrating one implementation of a color imaging technique according to an embodiment of the invention.

FIG. 3 is a flow diagram illustrating one mode of operation. According to one embodiment, a target value is set in a device-independent first color space (30), and then mapped to a point set in a second color space (32). The point set may be substantially complete such that it contains substantially all of the points in the second color space that map to the target value. The target value is generally a point in the device-independent color space that defines a desired color. A device, however, may be able to generate the desired color using one of a plurality of different colorant combinations. For instance, in one embodiment, a device implementing a CMYK gamut can vary K with respect to C, M, and Y to generate a color having substantially the same colorimetric value. Therefore, in a CMYK device, a single target value can be mapped to a plurality of different K values. Each K value can then have associated C, M, and Y values such that each collection of CMYK values generates a color having substantially the same colorimetric value. Generally, when the number of colorants in a device gamut is greater than the number of dimensions in a device-independent coordinate space, a single point in the device-dependent color space can be mapped to a point set in a device-dependent color space defined by the device's gamut. This, in turn, may create options for color imaging.

A point set is a collection of points. In one particular embodiment, the point set is a space curve through a four-dimensional CMYK space. In another embodiment, the point set is a collection of parametric functions. The point set may be substantially complete, containing substantially all of the points in the second color space that map to the target value. Still other embodiments may implement point sets having two-dimensional collections of points or multiple two-dimensional collections, three-dimensional collections of points or multiple three-dimensional collections, four-dimensional collections of points or multiple four-dimensional collections, five-dimensional collections of points or multiple five-dimensional collections, and so forth.

After a target value in the device-independent color space has been mapped to a point set in a second color space (32), a point may be chosen from the point set (34). Every point on the point set may have a colorimetric value equal to the colorimetric value of the target value. In other words, each point in the set of points defines a distinct combination of colorants that may be combined to produce substantially the same colorimetric value. Therefore, choosing a point from the point set may not substantially affect the visual perception of the resultant color. Nevertheless, particular points in the point set may be more desirable than others depending on the particular device and the particular application.

For instance, in some applications, it may be more desirable or less desirable to use particular colorants. Some colorants may be more expensive than others. In addition, some colorants may be used more often than others. In these situations, it can be highly advantageous to minimize the amount of a particular colorant that is used. In other applications, it can be advantageous to maximize the amount of a particular colorant. Moreover, in other applications it can be advantageous to use relatively equal amounts of two or more colorants. In still other applications, it may be desirable to use less of a colorant in particular locations of an image. For instance, the use of black may be minimized in highlight areas to avoid grainy images and the use of black may be maximized in shadow areas to minimize cost. Importantly, when choosing one of the points from the point set, these variables and goals can be taken into account.

Again, every point in the point set defines substantially the same colorimetric value. However, every point in the point set defines that same colorimetric value via a unique combination of colorants. Thus, after a point in the point set has been chosen (34), colorant values defining that point can be determined (36). These colorant values, then, can be used to generate the desired color, which might be used (38) as part of a print, e.g., with a combination of CMYK colorants, or display, e.g., with a combination of RGB phosphors or diodes.

In one embodiment, the point is chosen from the point set by an end user. In other embodiments, a machine chooses the point. To facilitate a machine decision, the machine may monitor one or more variables. Moreover, these variables may define one or more operational conditions of the machine. For instance, the machine may include a printer with a device that monitors the relative amounts of colorants currently in the printer. If any given colorant is running low in the printer, a point may be chosen from the point set such that use of that colorant is minimized or excluded altogether. In still other embodiments, a machine or a user may choose a point in the point set by specifying a parameter such as a colorant factor. The details surrounding parameters such as a colorant factor are discussed in more detail below.

The invention might be implemented whenever a target value defined in a first color space is mapped to a second color space, and the second color space has more dimensions than the first. By way of example, one particular embodiment involves K-range color generation when mapping from L*a*b* space to a device-dependent CMYK color space.

The K-range color generation may be used to produce a colorimetrically accurate reproduction of a device-independent color value in a device-dependent color space. Moreover, the K-range color generation may use the entire device gamut and may allow user control over the amount of black used by the device. Although much of the following exemplary description is provided in the context of CMYK, it may be applied more generally to any colorant combination where there is a perceptual or visual tradeoff between one colorant and one or more other colorants.

A K-range color generation technique generally recognizes that many levels or shades of black (K) can be reproduced using unique collections of cyan (C), magenta (M), and yellow (Y). Therefore, for any target color value, a point set can be generated, where each point in the point set defines substantially the same colorimetric value, but uses different amounts of K relative to C, M, and Y.

In K-range color generation, for any given target L*a*b* value, a space curve through a four-dimensional CMYK space may be traced out to determine the locus of matching colorant values. This locus of points can be reformatted as three parametric functions that represent the matching C, M and Y amounts as a function of K.

Figure 4:
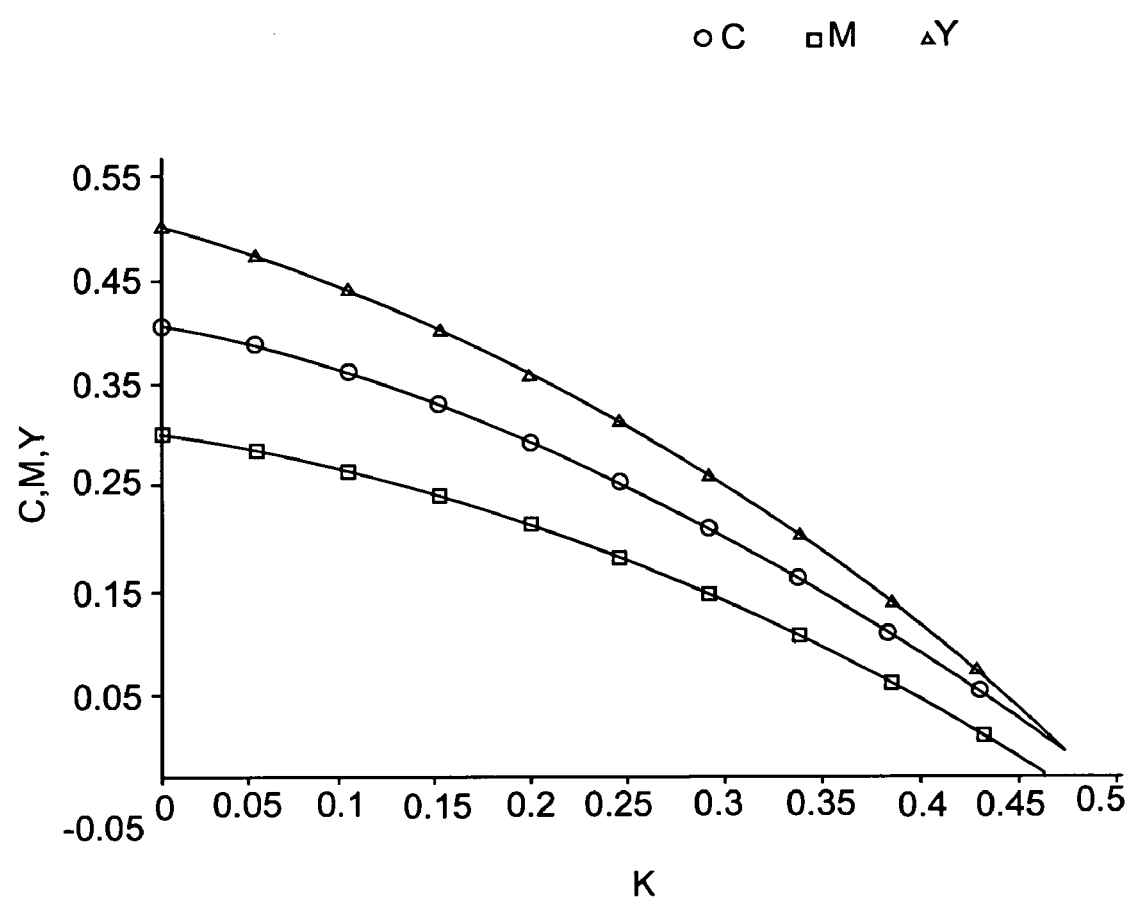
FIG. 4 is an example graph in accordance with an embodiment of the invention.

FIG. 4 is an example graph showing a complete point set in CMYK mapped from L*a*b*=(50,0,0). In FIG. 4, the point set is represented by three parametric functions that collectively define C, M, and Y as a function of K. Thus, for any K value on the graph, the three parametric functions define C, M, and Y such that a corresponding colorimetric value associated with each collection of colorant values is substantially the same as the colorimetric value defined by L*a*b*=(50,0,0).

The matching black range, or K-range, in FIG. 4 is [0, 0.49027]. The K-range may be determined by examining the extrema of the set of black values for which C, M, Y, and K are all within 0 and 1. In other words, K-range is defined by the following constraints ($0 \leq C \leq 1$; $0 \leq M \leq 1$; $0 \leq Y \leq 1$; $0 \leq K \leq 1$). Thus, in FIG. 4, the lower limit is $K_{min}=0$ because at levels of K below that point the $K \leq 0$ constraint is not satisfied. The upper limit $K_{max}$ is the point at which the magenta curve crosses the K axis, or $K_{max}=0.49027$.

In this example, the trade-off is between approximately equal amounts of C, M, and Y versus K. Therefore, the C, M, and Y curves appear monotonically decreasing with increasing K. In other embodiments, however, a point set may have a more sporadic colorant combination. Importantly, however, in every embodiment every point in the point set defines substantially the same colorimetric value. For instance, as shown in FIG. 4, the four dimensional point CMYK (0.41, 0.32, 0.51, 0.00) defines substantially the same colorimetric value as the point (0.39, 0.30, 0.48, 0.05) and the point (0.37, 0.28, 0.45, 0.10) and the point (0.34, 0.26, 0.42, 0.15) and the point (0.31, 0.23, 0.38, 0.20) and the point (0.27, 0.20, 0.33, 0.25) and the point (0.23, 0.17, 0.28, 0.30) and the point (0.19, 0.13, 0.22, 0.35) and the point (0.14, 0.09, 0.16, 0.40) and the point (0.08, 0.04, 0.09, 0.45) etc.

Figure 5:
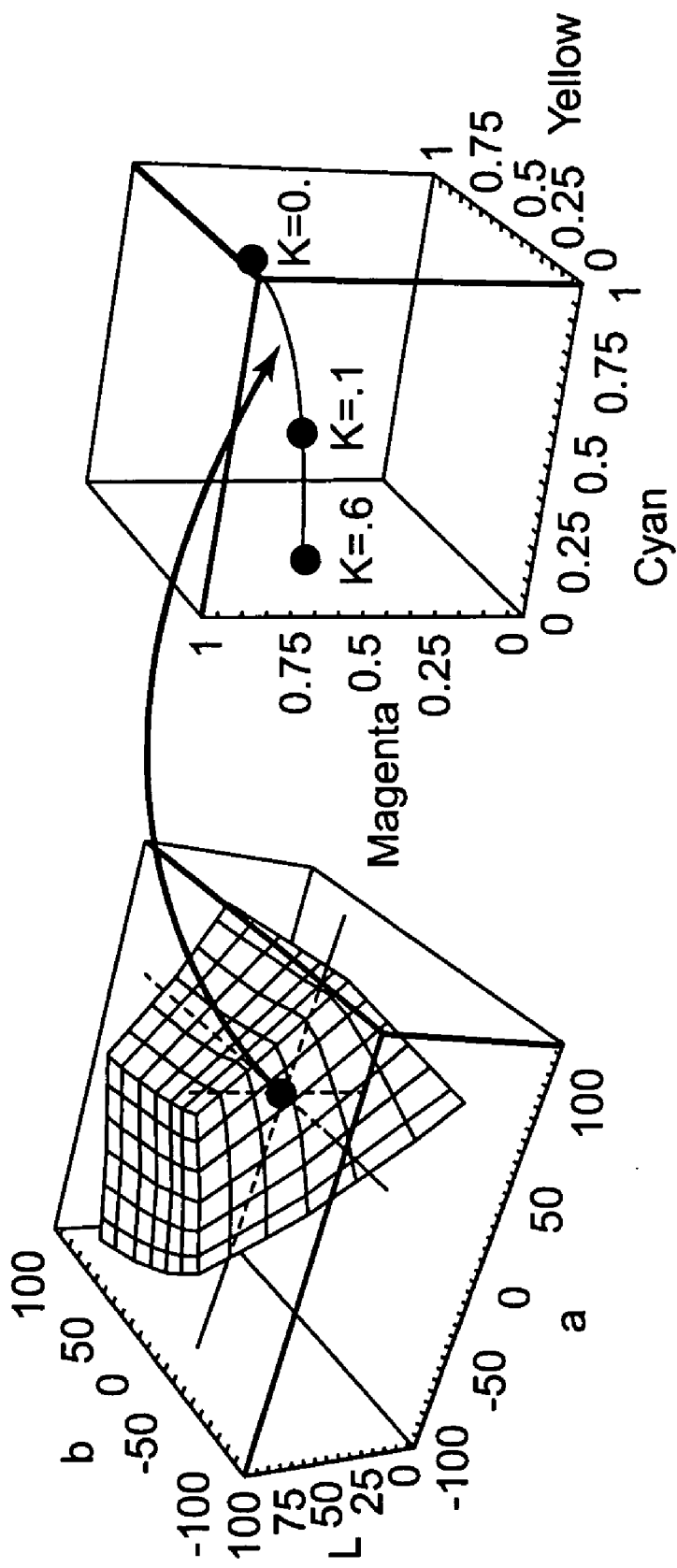
FIG. 5 is an exemplary graphical representation of a point in device-independent coordinates mapped to a substantially complete point set in CMYK coordinates.

FIG. 5 is an exemplary graphical representation of a point in device-independent L*a*b* coordinates mapped to a substantially complete point set in CMYK coordinates. Because of the difficulty in graphically representing four dimensions, a 3D parametric space curve with black (K) as the parameter has been used to represent the 4D point set in CMYK.

Once a target value has been mapped from L*a*b* space to a point set in CMYK space, a point can be chosen from the point set. In one embodiment, the point is chosen via a user specified colorant factor. As long as the colorant factor produces device coordinates that satisfy the constraints mentioned above, the device gamut will be capable of reproducing the target value using the colorant factor. The colorant factor may enable a user to more easily choose a point from the point set. For instance, a K-factor ($\kappa$) can be specified to select the black separation value from within the minimum and maximum allowable K values ($K_{min}$ and $K_{max}$ respectively) for a colorimetric match to the target value.

$\kappa$ is a real number between zero and one, and it specifies the amount of black that is used. $\kappa=0$ specifies that the minimum amount of black should be used. $\kappa=1$ specifies that the maximum amount of black should be used. All values of $\kappa$ between 0 and 1 represent differing levels of black, with numbers closer to 0 representing black levels closer to the minimum required amount and numbers closer to 1 representing black levels closer to the maximum allowable amount. $\kappa$ may be used as the parameter in parametric representations of the C, M, and Y curves such as those in FIGS. 4, 6A, and 6B. For example, a parametric representation of a cyan curve could be $C=f_c(\kappa)$ for $0 \leq \kappa \leq 1$.

$\kappa$ may be specified by a user, or may be automatically generated by passing $K_{min}$ and $K_{max}$ through a non-linear function. For instance, in one embodiment, $K_{mid}=\frac{1}{2}(K_{max}+K_{min})$ is calculated and then passed through a nonlinear function:

$$\kappa = \begin{cases} \left(\dfrac{K_{mid}-\text{onset}}{1-\text{onset}}\right)^{\gamma} & K_{mid} > \text{onset} \\ 0 & \text{otherwise} \end{cases}$$

where onset is the desired black onset level and the exponent $\gamma$ is typically greater than 1.0 to provide a smooth onset of the black colorant. Nonlinear functions such as this, which are commonly used in under color removal or gray component replacement settings, can be used to favor less black in the highlights and more black in the shadows.

As described above, each point in the point set may define substantially the same colorimetric value. However, the visual perception of these different points may still vary. For instance if a color is generated using the maximum amount of K, the output may include one or more single high contrast black dots in one unit of area. If, on the other hand, color is generated using the minimum amount of K, the output may include dots of C, M, and Y in the same single unit of area. Therefore, the output of a color generated using the minimum amount of black may visually appear smoother and less grainy. For this reason, generating $\kappa$ using the function above may enhance the visual perception of an image while minimizing cost.

In still another embodiment, $\kappa$ is selected by a machine such as a printer. The printer may monitor one or more variables such as the relative amounts of colorants currently in the printer. If any given colorant is running low in the printer, a point may be chosen from the point set, such that use of that colorant is minimized. Whichever way $\kappa$ is selected or determined, the $\kappa$ may then be used to identify the desired point in the point set.

Figure 6A:
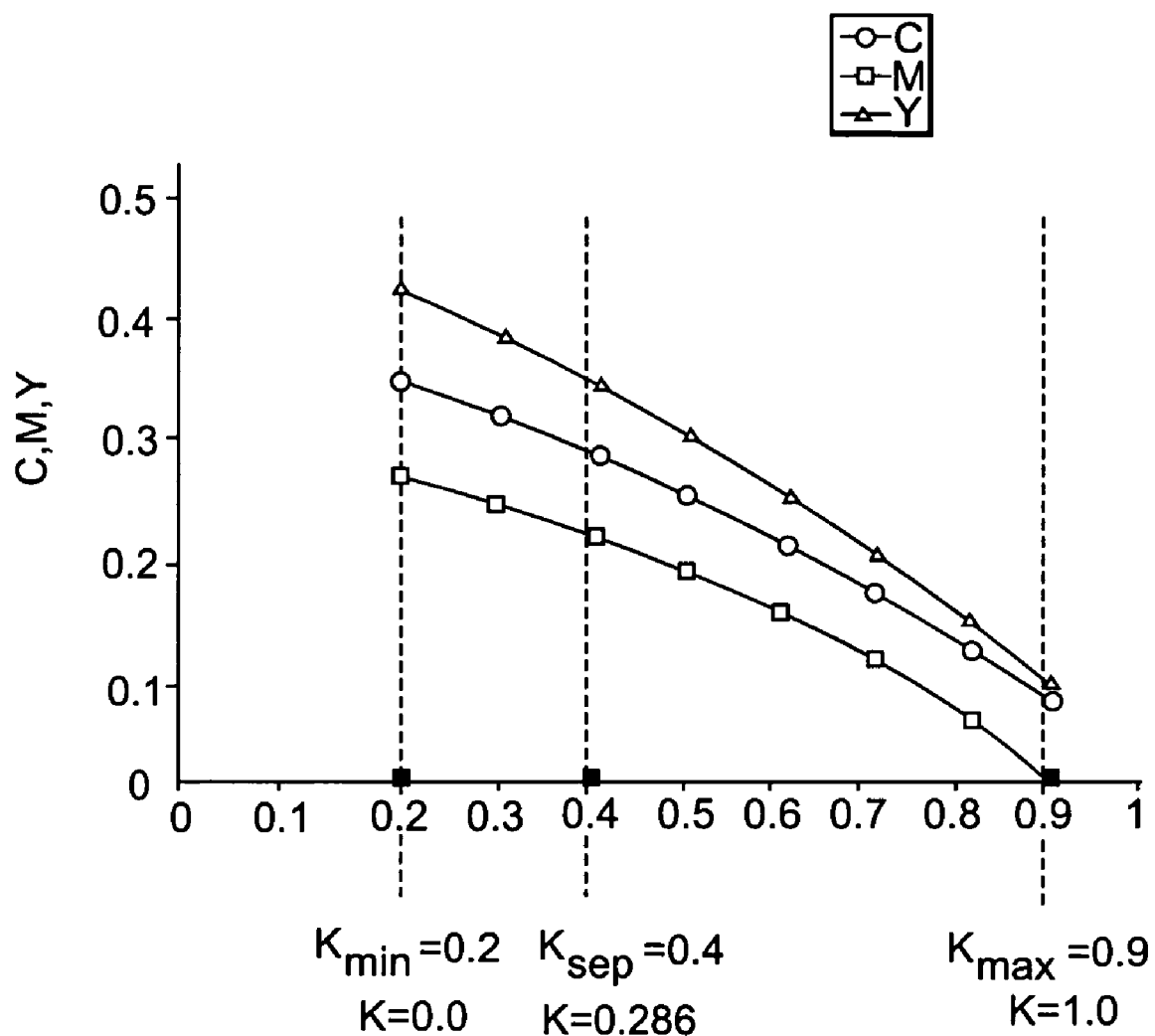
FIGS. 6A and 6B are additional example graphs showing two different possible K-ranges in accordance with embodiments of the invention.
Figure 6B:
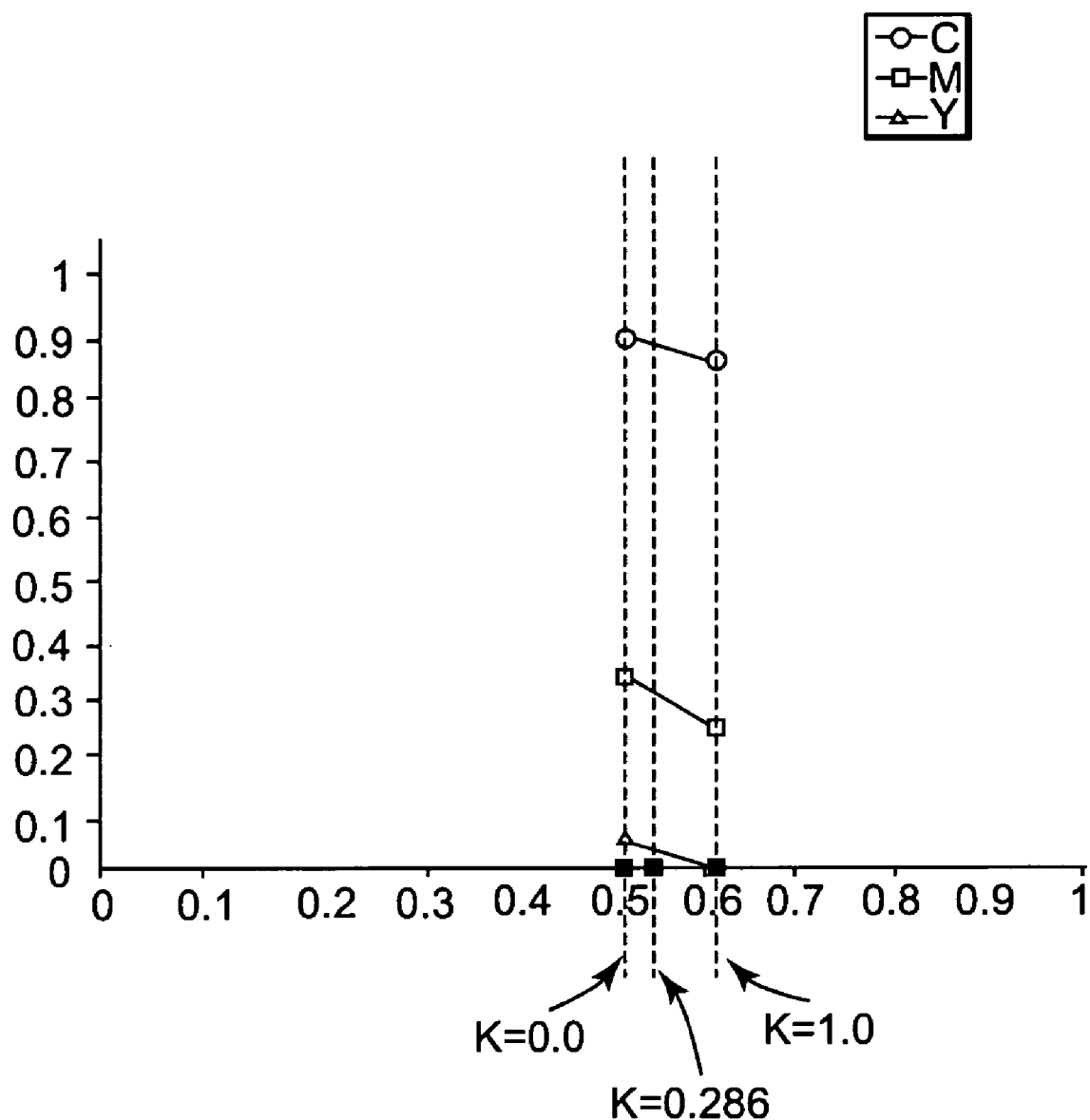

A black separation value may be computed from $\kappa$ and the K range as $K_{sep}=\kappa(K_{max}-K_{min})+K_{min}$. FIGS. 6A and 6B show two different matching ranges (which could occur at different points within a single image). FIG. 6A illustrates a relatively large matching range while FIG. 6B illustrates a relatively small matching range. Black values for K-factor=0.0 (minimum black), 1.0 (maximum black), and 0.286 (intermediate black) are marked with squares on the horizontal axis of each graph.

One difficult task in K-range color generation is determination of the range of matching colorant values and elements of the point set. In some configurations, finding the range of matching colorant values can be particularly costly from a computational standpoint.

One way of finding the range of matching colorant values and elements of the point set involves first finding a matching set of colorant values for any point in the point set. Any method can be used to find the first match, such as a model based search or look up tables (such as the BtoA table of an ICC device profile). Model based computations can be either forward or inverse. A forward model is a computation that converts device-dependent coordinates such as CMYK into spectral reflectance or tristimulus coordinates. Using a mathematical framework of parametric equations and methods of deriving the necessary parameters from measurements, a particular printing device can be modeled. See R. S. Berns, *Spectral Modeling of a Dye Diffusion Thermal Transfer Printer*, Journal of Electronic Imaging, Vol. 2(4), October 1993, pages 359–370. The inverse model is a colorant formulation process that is a model-based search. Evaluation of an inverse model is a search process involving repeated evaluations of the forward model. In other words, by using the input device-independent coordinates and the derived parameters, a set of matching device-dependent coordinates can be computed.

Once a first match is found, the process continues by increasing the initial match's black value by some small amount, fixing it at this modified level, and determining whether CMY values that produce a color match can be found. If so, the new device-dependent (CMYK) coordinates are added to the point set, the black value is again incremented, and the process repeats; otherwise the black value from the previous iteration is used as $K_{max}$. A similar process, but with decreasing K values from the initial point may be used to find $K_{min}$.

Figure 7:
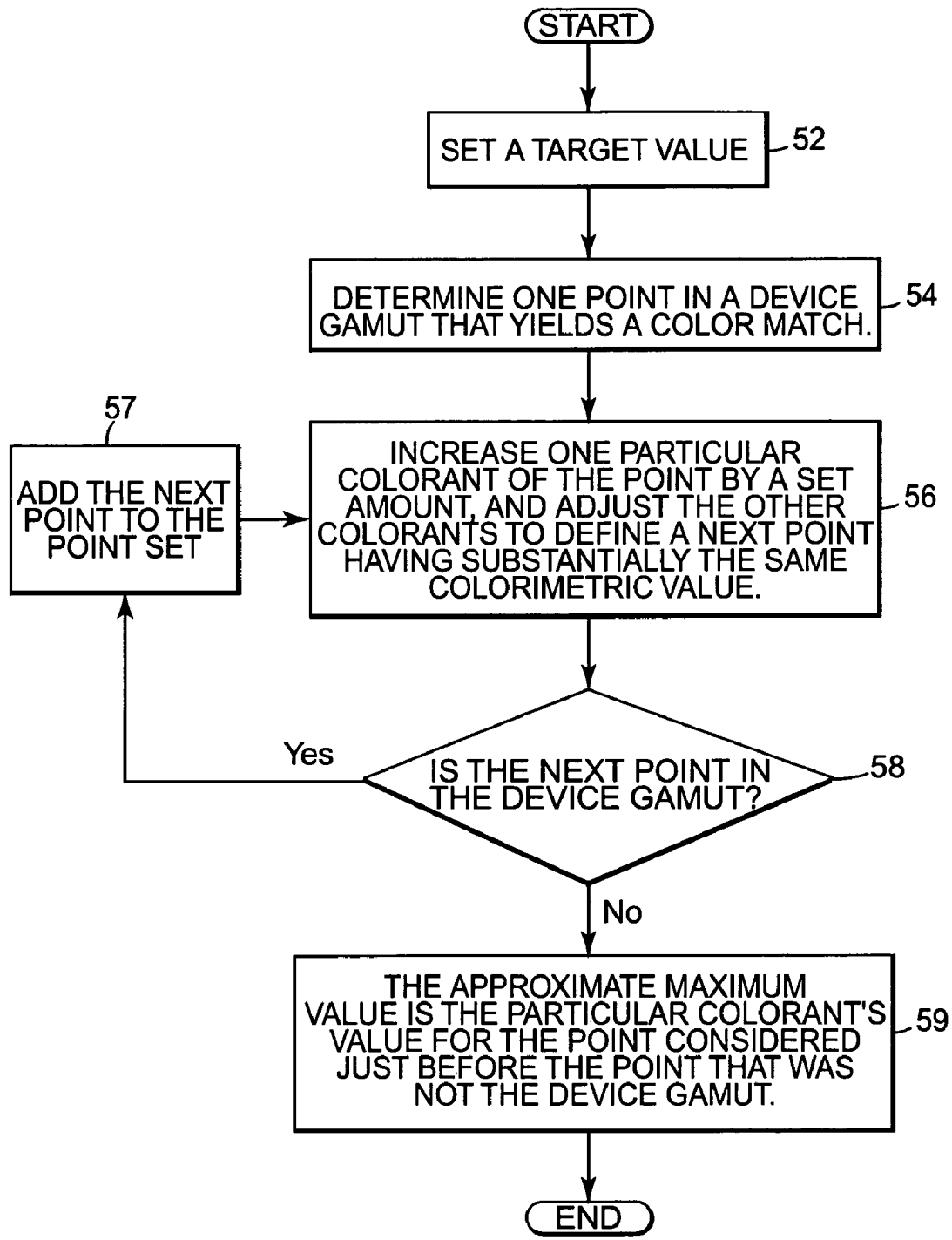
FIG. 7 is a flow diagram illustrating determination of a maximum value of a particular colorant within a device gamut.

FIG. 7 is a flow diagram illustrating one method of finding a maximum value of a particular colorant. As shown, a target value set (52) and one point in a device gamut that yields a color match to the target value is determined (54). One particular colorant of the point is increased by a set amount. The remaining colorants are adjusted to obtain a color match to the target at this increased level of the one colorant. The increased and adjusted colorant values define a next point (56). If the next point is within the device gamut, the next point is added to the point set (57), then the particular colorant is again incremented (56). However, as soon as a point is not in the device gamut (58), the approximate maximum value of that particular colorant can be determined. The approximate maximum value is the particular colorant's value for the point considered just before the point that was not in the device gamut (59).

Figure 8:
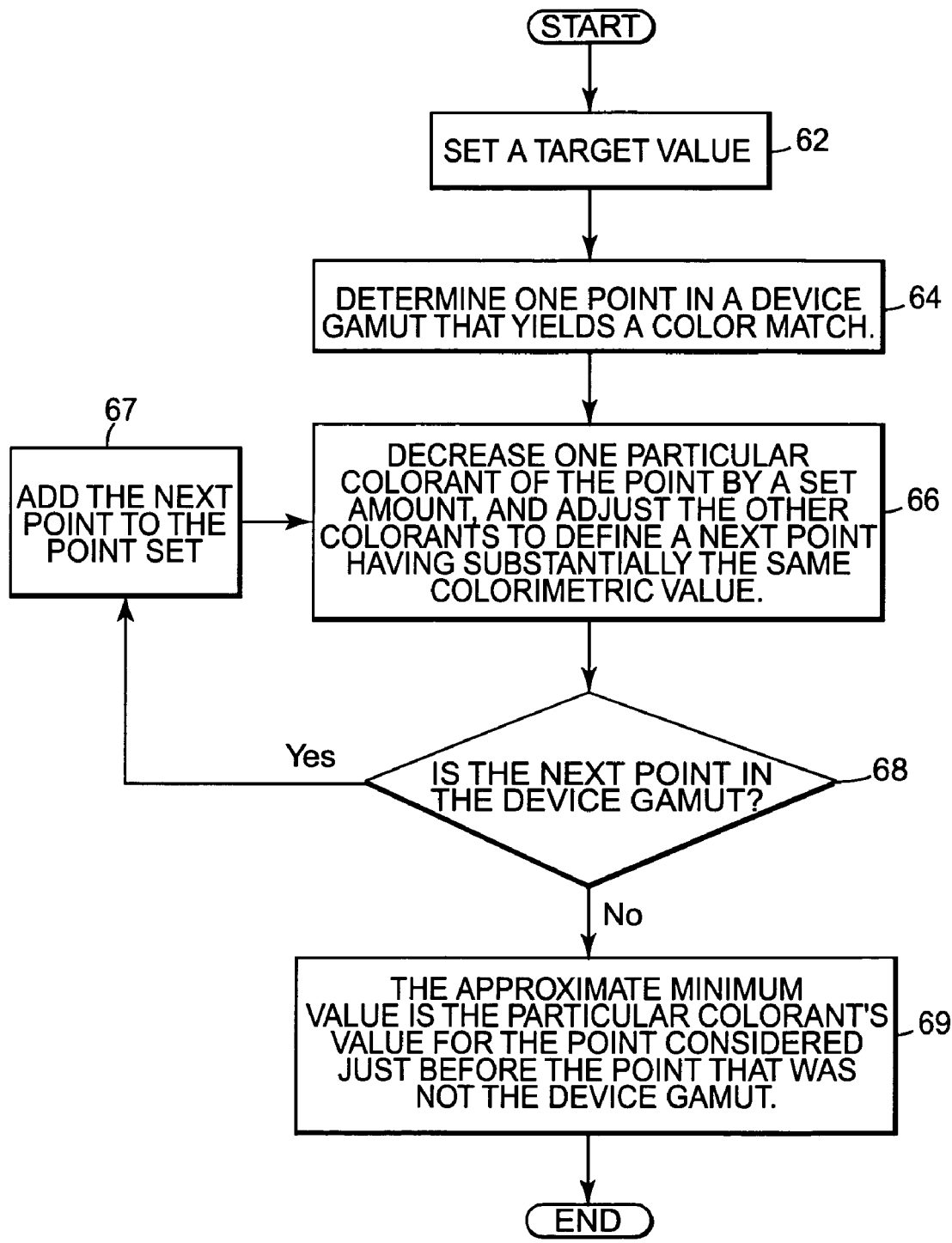
FIG. 8 is a flow diagram illustrating determination of a minimum value of a particular colorant.

FIG. 8 is a flow diagram illustrating one method of finding a minimum value of a particular colorant. As shown, a target value is set (62) and one point in a device gamut that yields a color match to the target value is determined (64). One particular colorant of the point is decreased by a set amount. The remaining colorants are adjusted to obtain a color match to the target at this decreased level of the one colorant. The decreased and adjusted colorant values define a next point (66). If the next point is in the device gamut, the next point is added to the point set (67), then the particular colorant is again decremented (66). However, as soon as a point is not in the device gamut (68), the approximate minimum value of that particular colorant can be determined. The approximate minimum value is the particular colorant's value for the point considered just before the point that was not in the device gamut (69).

Depending on the range of K values that can produce a color match to the target value and the size of increments used in the computational process, determination of the full matching range may require a large number of forward model evaluations. For some applications, this large number of forward model evaluations may be prohibitive from a computational standpoint.

An alternate approach is referred to as the geometric inverse model. A 3-D structured grid can represent the gamut of a set of three colorants. This grid is a collection of hexahedral cells generated by a regular sampling of each of the colorants. The topology of the structured grid is represented implicitly by specifying a 3-vector of dimensions. The geometry is explicitly represented by maintaining an array of point coordinates. The structured grid has a natural coordinate system that allows one to refer to a particular point or cell using topological coordinates. See Schroeder, et al., "The Visualization Toolkit, $2^{nd}$ Ed.", Prentice Hall, 1998, pages 126-30. Each vertex of this grid has a position (an L*a*b* value) and a color (the device coordinates that generated the vertex's L*a*b*). For this reason, the structured grid can be easily generated from a relatively small number of forward model evaluations.

Evaluation of the structured grid comprises first locating the hexahedron containing the target L*a*b* point, and then interpolating matching colorant values from the target location and the colorant values at the vertices of the enclosing cell. The step of locating the hexahedron containing the target can be accelerated through the use of structures such as oct-trees, which create lists of cells which lie within regular regions in the position space (L*a*b* for gamuts). Locating a cell may comprise accessing the list for the region in which the target point lies, and then searching that list for the actual enclosing cell. Interpolating colorant values from the cell vertices may involve first finding the parametric coordinates (with respect to the cell's origin) of the target point, and then determining interpolation weights for each vertex from the target's parametric coordinates.

A geometric inverse model is constructed as a sampled geometric representation of an N-dimensional (N-D) gamut. This N-D gamut representation may be built up from a collection of 3-D structured grids. Generally, a sampled geometric representation of an N-D hypercube may be used to represent that volume by sampling its boundary and its interior with (N−1)-dimensional objects. By letting $\eta(N,M)$ be the number of M-dimensional objects needed to bound an N-D hypercube, $\eta(N,M)$ may be computed as:

$$\eta(N, M) = \begin{cases} 2^{N-M}\binom{N}{M}, & N > M \\ 1, & N = M \\ 0, & N < M \end{cases}$$

where $$\binom{N}{M}$$

is the binomial coefficient for integer N and M defined as:

$$\binom{N}{M} = \frac{N!}{M!(N-M)!}.$$

For example, the number of 2-D surfaces required to bound a 3-D volume is $\eta(3,2)$ or $$\eta(3, 2) = 2^{3-2}\binom{3}{2} = 2^1 \cdot \frac{3!}{2!(3-2)!} = 2 \cdot \frac{3 \cdot 2 \cdot 1}{2 \cdot 1 \cdot 1} = 6.$$

Figure 1:
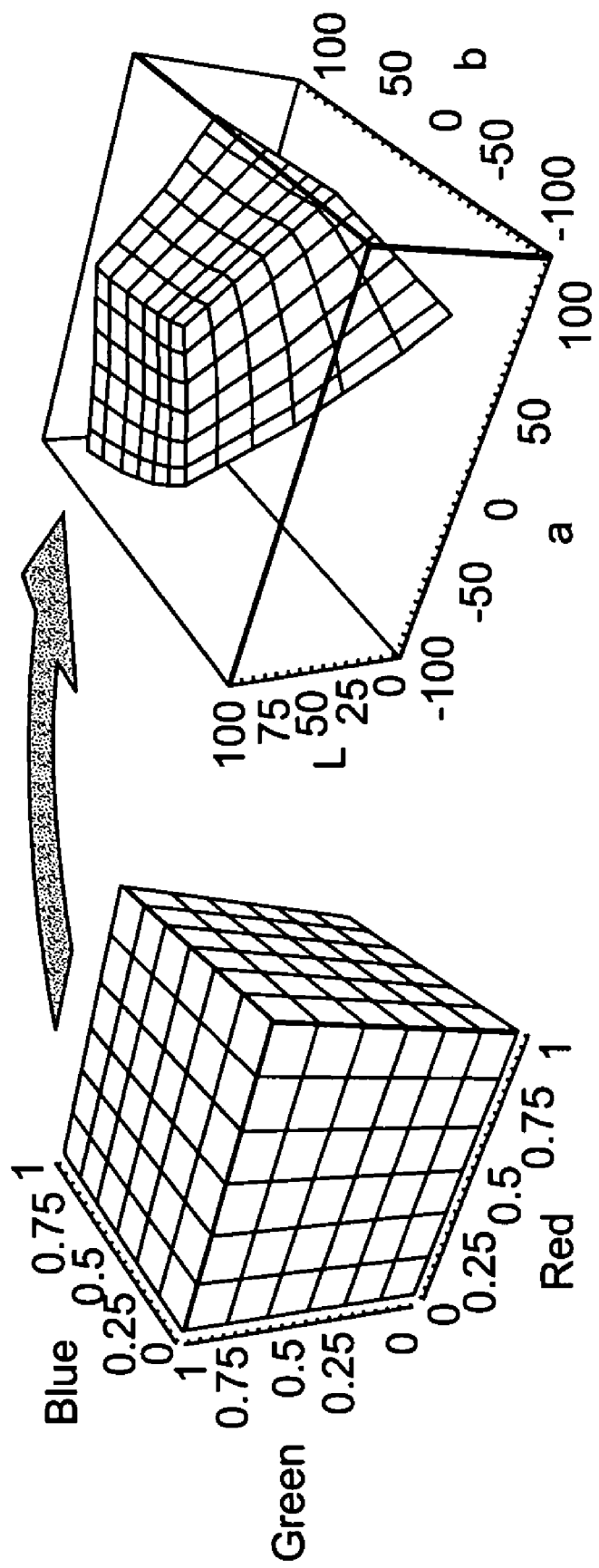
FIG. 1 is an example representation of a device-dependent gamut and a device-independent gamut.

These six bounding surfaces are simply the surfaces of a cube, like the cube shown on the left of FIG. 1. However, for 4-D hypervolumes, the number of 3-D bounding volumes required is $\eta(4,3)=8$.

Figure 9A:
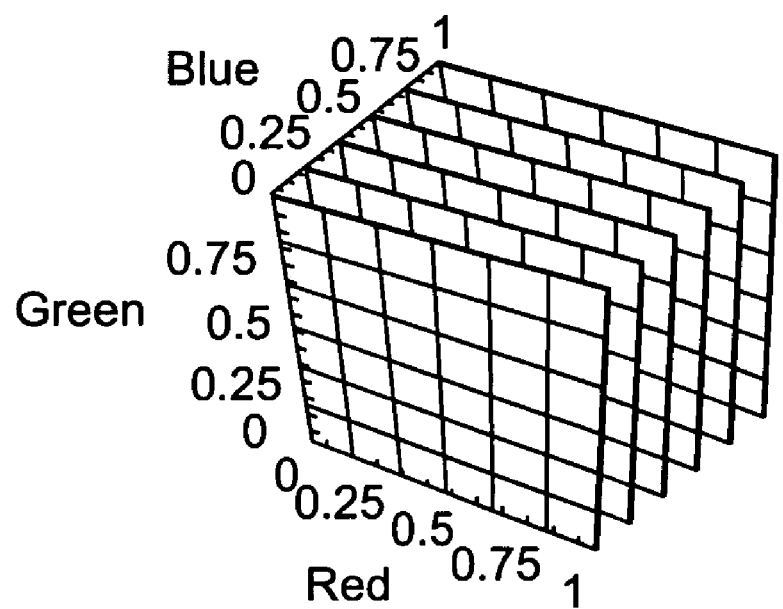
FIGS. 9A and 9B illustrate exemplary two-dimensional interior gamuts.
Figure 9B:
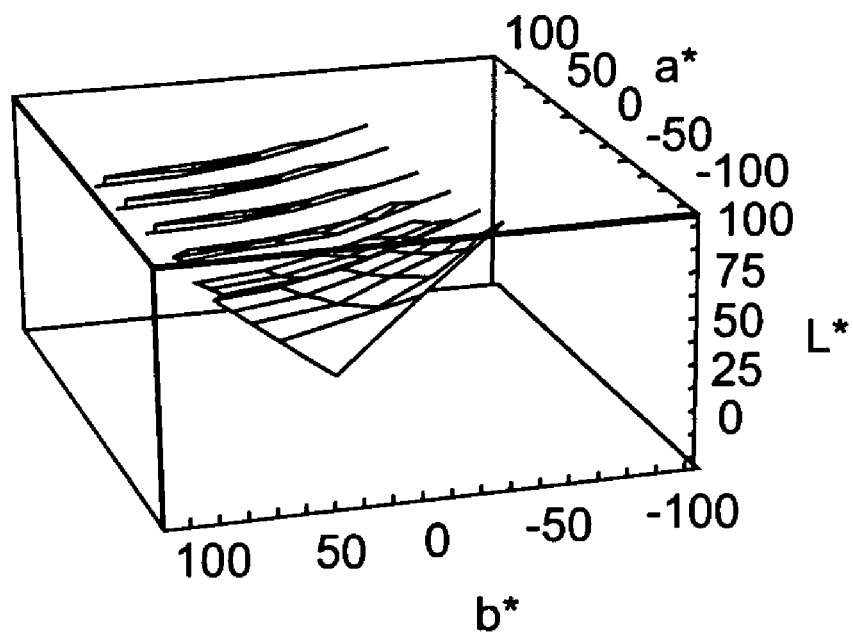

The number $\eta(N, N-1)$ is the number of (N−1)-dimensional objects that bound an N-dimensional hypercube. These $\eta(N, N-1)$ objects do not, however, sample the interior of the N-D hypercube. To sample the interior, some number of additional (N−1) or lower-dimensional objects, referred to as interior gamuts, must be used. The interior gamuts sample the color space with (N−1)-dimensional objects. Within each interior gamut the colorant value for the one missing dimension (the "−1" in "N−1") is held constant while the other N−1 colors are varied. The set of interior gamuts sample the last dimension at some number of steps from the corresponding colorant's minimum to maximum values. For example, FIG. 9A shows six interior gamuts for an RGB device-dependent coordinate space, while FIG. 9B shows the same planes mapped into device-independent coordinates. Within each interior gamut, the Blue value is held constant at some level while the Red and Green values are varied within their allowable ranges.

The boundary of a four-dimensional gamut can be represented by a collection of eight 3-D boundary gamuts in which each colorant is in turn fixed at zero and one while the other three colorants are allowed to vary. Since they are constructed from colorant sets in which at least one colorant is at a limit, these eight "boundary" gamuts contain the endpoints of a space curve of matching colorant values because the space curve begins and ends at the locations where one or more colorants reach a limiting value.

The interior of a 4-D gamut may be represented by an additional set of 3-D interior gamuts. These gamuts are generated with black fixed at one of a set of increasing values. For example, black may be fixed at 5% intervals ($K=\{0.0, 0.05, 0.1, 0.15, \ldots, 0.95, 1.0\}$), for a total of 21 interior gamuts. In L*a*b* space the interior gamuts appear as a collection of volumes, shrinking downward away from the white point and inward to lower chromas (C*) with increasing levels of black.

Determining the point set corresponding to a target L*a*b* point using the boundary and interior gamuts is straightforward. Each 3-D boundary or interior gamut is implemented as a structured grid that may be searched as described above to determine whether it contains the target point. If it does, then the colorant values at the target point are interpolated from the enclosing cell's vertex color values, and the interpolated point is added to the point set. The minimum and maximum values for the black channel can also be updated as each enclosing gamut is searched. The matching black range, then, is valid after all boundary and interior gamuts have been processed.

The elements of the point set may be ordered according to increasing black value and spline or other interpolation functions may be used to obtain the C, M, and Y parametric curves to represent the 4-D space curve of matching colorant values. Given these parametric curves and the matching black range, a target black value $K_{sep}$ and corresponding C, M, and Y separation values may be computed using the K-factor method described above.

If there are no complex constraints on the point set such as maximum black levels or total ink limits, then the above process may be optimized as follows. In such cases, evaluation of the boundary gamuts alone is sufficient to determine the matching black range. $K_{sep}$ is then computed normally from the matching black range. The final separation values may then be linearly interpolated between the two gamuts that bound $K_{sep}$. These two gamuts may be either interior gamuts or boundary gamuts. If the black value of the interior gamut immediately below $K_{sep}$ is less than the black range minimum, then the boundary gamut that produced the range minimum is the lower interpolation gamut. Similarly, if the black value of the interior gamut immediately above $K_{sep}$ is greater than the black range maximum, then the boundary gamut that produced the range maximum is the upper interpolation gamut. Otherwise both gamuts that bound $K_{sep}$ are interior gamuts.

These upper and lower interpolation gamuts may then be evaluated to determine their colorant values at the target $L^*a^*b^*$. The final separation values may be computed using the lower and upper colorant sets as $C_{final}=(C_{high}-C_{low})*(K_{sep}-K_{low})/(K_{high}-K_{low})+C_{low}$ where $C_{final}$ is the final separation value, and $C_{high}$, $C_{low}$, $K_{high}$, and $K_{low}$ are the upper and lower gamut's separation and black values. The computational savings can be significant: if 21 interior gamuts are used, the optimized method requires evaluation of at most only 8+2=10 3-D gamuts versus 8+21=29 3-D gamuts in the more general case.

The invention is not limited to the above example of representing a four-dimensional gamut by collections of 3-D gamuts. In a further example, consider a printing device with five colorants, cyan, magenta, yellow, black, and green. The corresponding 5-D gamut is bounded by $\eta(5,4)=10$ 4-D boundary gamuts. Additional 4-D interior gamuts are necessary to represent the interior of the 5-D gamut. With $L^*a^*b^*$ as the device-independent second color space, points in $L^*a^*b^*$ space may correspond to point sets in the 5-D colorant space that are 2-D surfaces (as opposed to the 1-D space curve in the 4-D CMYK case). FIG. 6 represented 4-D space curves as three curves of three colorants that were functions of the fourth colorant and defined over the matching range of the fourth colorant. The equivalent of FIG. 6 in the 5-D case is three surfaces of three colorants that are functions of the fourth and fifth colorants and defined over the (not necessarily rectangular) matching domain of the fourth and fifth colorants. To obtain such representations, one may choose to treat black and green as the fourth and fifth colorants, that is, as the parameters of the surfaces representing the first three colorants. Determining a set of matching colorants in this 5-D example requires selection of a point from within the matching black-green domain and then evaluating the C, M, and Y parametric surfaces at the parameter values of the selected point. The point in the matching domain may be selected on the basis of any of the techniques described above in the CMYK examples, including colorant factors, spectral comparisons, and the like. The matching black-green domain and the corresponding C, M, and Y surfaces may be determined by evaluating the 4-D boundary and interior gamuts of the 5-D gamut using methods similar to the CMYK example previously described.

Still additional variables may be taken into account when defining the point set. For instance, a maximum amount of a particular colorant may pose a limitation on the matching range. In addition a total colorant limit, or total ink limit (in a printer example) may pose a limitation on the matching range. Still further constraints on arbitrary combinations of colorants may be imposed. These or other variables may be introduced to limit elements of the point set.

Although much of the forgoing description was provided in the context of CMYK devices, the invention may be implemented generally whenever there is a perceptual or visual tradeoff between one colorant and one or more other colorants. For instance, the methods described herein could also be applied when generating high fidelity color separations, e.g. in a device whose colorants include cyan, magenta, yellow, black, orange, and green. In such devices, a particular color may be traded off with respect to defined levels of three of the other colors. In addition, the invention could be applied to arbitrary colorant sets that may have multiple ways of producing colors with substantially the same colorimetric values.

Various embodiments of the invention have been described. For example, colorimetrically accurate methods have been described which use the entire device gamut, operate on device-independent input and allow control over the amount of specific colorants used. The methods may be implemented in computer code and the code may be stored on a computer readable medium. These and other embodiments are within the scope of the following claims.

The invention claimed is:

1. A method comprising:
    setting a target value in a device-independent first color space,
    mapping the target value to a point set in a second color space, wherein the point set defines a plurality of points each of which define a colorimetric value via a unique combination of colorants and wherein the colorimetric value defined by each point in the point set is substantially the same, and
    choosing a point from the point set based, at least in part, on a spectrally-based comparison between a first spectrum associated with the target value and a set of spectra associated with points in the point set.

2. The method of claim 1, wherein the second color space is a device-dependent color space.

3. The method of claim 1, wherein the first color space is an n-dimensional color space, and the second color space is an m-dimensional color space, wherein m is greater than n.

4. The method of claim 1, the method further comprising: determining a set of device-dependent colorant values defined by the point in the point set.

5. The method of claim 4, the method further comprising: printing a color, the color being defined by the set of device-dependent colorant values.

6. The method of claim 1, wherein the target value has a colorimetric value substantially equal to the colorimetric value of each of the points in the point set.

7. The method of claim 1, wherein the first color space is a three-dimensional color space.

8. The method of claim 1, wherein the second color space is a four-dimensional color space.

9. The method of claim 8, wherein the point set is a space curve.

10. The method of claim 8, wherein the second color space is defined by four colors: black, magenta, cyan, and yellow.

11. The method of claim 8, wherein the second color space is defined by at least four colors of the following group of colors: black, magenta, cyan, yellow, orange and green.

12. The method of claim 1, wherein choosing a point in the point set is manually performed by an end user.

13. The method of claim 1, wherein choosing a point on the point set is automatically performed by a machine.

14. The method of claim 13, wherein the machine monitors at least one variable, the variable defining at least one machine operational condition, and the machine chooses the point in the point set based, at least in part, on the variable.

15. A system comprising:
    a memory that stores a target value, the target value being a value in a device-independent first color space; and
    a processor that maps the target value to a point set in a second color space and chooses a point from the point set based, at least in part, on a spectrally-based comparison between a first spectrum associated with the target value and a set of spectra associated with points in the point set, wherein the point set defines a plurality of points each of which define a colorimetric value via a unique combination of colorants and wherein the colorimetric value defined by each point in the point set is substantially the same.

16. The system of claim 15, wherein the second color space is a device-dependent color space.

17. The system of claim 15, wherein the first color space is an n-dimensional color space, and the second color space is an m-dimensional color space,
wherein in is greater than n.

18. The system of claim 15, wherein the processor determines a set of device-dependent colorant values defined by the point in the point set.

19. The system of claim 18, further comprising a printer that prints a color, the color being defined by the set of device-dependent colorant values.

20. The system of claim 15, wherein the target value has a colorimetric value substantially equal to the colorimetric value of all points in the point set.

21. The system of claim 15, wherein the processor monitors at least one variable, the variable defining at least one printer condition; and
wherein the processor chooses the point in the point set as determined, at least in part, by the variable.

22. A method comprising:
setting a target value in a device-independent first color space,
mapping the target value to a space curve in a second color space,
representing the space curve as a collection of parametric curves, and
choosing a point on the space curve, wherein choosing the point on the space curve is automatically performed by a machine, and wherein the machine chooses the point on the space curve based, at least in part. on a spectrally-based comparison between a first spectrum associated with the target value and a set of spectra associated with points on the space curve.

23. The method of claim 22, wherein the second color space is a device-dependent color space.

24. The method of claim 22, wherein the first color space is an n-dimensional color space, and the second color space is an m-dimensional color space,
wherein m is greater than n.

25. The method of claim 22, the method further comprising:
determining a set of device-dependent colorant values defined by the point on the space curve.

26. The method of claim 25, the method further comprising:
printing a color, the color being defined by the set of device-dependent colorant values.

27. The method of claim 22, wherein the target value has a colorimetric value substantially equal to the colorimetric value of all points on the space curve.

28. The method of claim 22, wherein the first color space is a three-dimensional color space.

29. The method of claim 22, wherein the second color space is a four-dimensional color space.

30. The method of claim 29, wherein the second color space is defined by four colors: black, magenta, cyan, and yellow.

31. The method of claim 29, wherein the second color space is defined by four colors of the following group of colors: black, magenta, cyan, yellow, orange and green.

32. The method of claim 22, wherein the machine monitors at least one variable, the variable defining at least one machine operational condition;
and wherein the machine chooses a point on the space curve as determined, at least in part, by the variable.

33. A computer-readable medium containing program code that when executed by a computer:
sets a target value in a device-independent first color space,
maps the target value to a point set in a second color space, wherein the point set defines a plurality of points each of which define a colorimetric value via a unique combination of colorants and wherein the colorimetric value defined by each point in the point set is substantially the same, and
chooses a point from the point set based, at least in part, on a spectrally-based comparison between a first spectrum associated with the target value and a set of spectra associated with points in the point set.

34. A method comprising:
setting a target value in a device-independent first color space,
mapping the target value to a substantially complete point set in a second color space, wherein the point set defines a plurality of points each of which define a colorimetric value via a unique combination of colorants and wherein the colorimetric value defined by each point in the point set is substantially the same, and
choosing a point from the point set based, at least in part, on a variable defining at least one machine operational condition.

35. The method of claim 34, wherein the machine operational condition comprises a level of one or more colorants currently in a printer.

36. A method comprising:
setting a target value in a device-independent first color space,
mapping the target value to a substantially complete point set in a second color space, wherein the point set defines a plurality of points each of which define a colorimetric value via a unique combination of colorants and wherein the colorimetric value defined by each point in the point set is substantially the same, and
choosing a point from the point set based, at least in part, on a spectrally-based comparison between a first spectrum associated with the target value and a set of spectra associated with points in the point set.

37. A method comprising:
setting a target value in a device-independent first color space,
mapping the target value to a space curve in a second color space,
representing the space curve as a collection of parametric curves, and
choosing a point on the space curve, wherein choosing the point on the space curve is manually performed by an end user.

* * * * *

UNITED STATES PATENT AND TRADEMARK OFFICE
CERTIFICATE OF CORRECTION

PATENT NO. : 7,177,047 B2 Page 1 of 1
APPLICATION NO. : 09/741460
DATED : February 13, 2007
INVENTOR(S) : William A. Rozzi It is certified that error appears in the above-identified patent and that said Letters Patent is hereby corrected as shown below:

Column 13, Line 11, In Claim 17, delete "in" and insert -- m --, therefor.

Column 13, Line 36 In Claim 22, delete "part." and insert -- part, --, therefor.

Signed and Sealed this

Twelfth Day of June, 2007

JON W. DUDAS
*Director of the United States Patent and Trademark Office*